United States Patent
Chuang et al.

(10) Patent No.: US 11,151,416 B2
(45) Date of Patent: Oct. 19, 2021

(54) METHOD AND APPARATUS FOR EFFICIENTLY PROCESSING CONVOLUTION NEURAL NETWORK OPERATIONS

(71) Applicant: Expedera, Inc., Palo Alto, CA (US)

(72) Inventors: Shang-Tse Chuang, Los Altos, CA (US); Sharad Vasantrao Chole, San Jose, CA (US); Siyad Chih-Hua Ma, Palo Alto, CA (US)

(73) Assignee: Expedera, Inc., Palo Alto, CA (US)

(*) Notice: Subject to any disclaimer, the term of this patent is extended or adjusted under 35 U.S.C. 154(b) by 118 days.

(21) Appl. No.: 16/568,195

(22) Filed: Sep. 11, 2019

(65) Prior Publication Data

US 2021/0073585 A1    Mar. 11, 2021

(51) Int. Cl.
*G06K 9/62* (2006.01)
*G06N 3/04* (2006.01)

(52) U.S. Cl.
CPC ......... *G06K 9/6257* (2013.01); *G06K 9/6231* (2013.01); *G06N 3/04* (2013.01)

(58) Field of Classification Search
CPC ....... G06K 9/6257; G06K 9/6231; G06N 3/04
See application file for complete search history.

(56) References Cited

U.S. PATENT DOCUMENTS

| 2016/0062947 A1* | 3/2016 | Chetlur | G06F 17/153 708/420 |
| 2018/0129893 A1* | 5/2018 | Son | G06N 3/063 |

* cited by examiner

*Primary Examiner* — David F Dunphy
(74) *Attorney, Agent, or Firm* — Dag Johansen, Esq.

(57) ABSTRACT

Artificial intelligence is an increasingly important sector of the computer industry. One of the most important applications for artificial intelligence is object recognition and classification from digital images. Convolutional neural networks have proven to be a very effective tool for object recognition and classification from digital images. However, convolutional neural networks are extremely computationally intensive thus requiring high-performance processors, significant computation time, and significant energy consumption. To reduce the computation time and energy consumption a "cone of dependency" and "cone of influence" processing techniques are disclosed. These two techniques arrange the computations required in a manner that minimizes memory accesses such that computations may be performed in local cache memory. These techniques significantly reduce the time to perform the computations and the energy consumed by the hardware implementing a convolutional neural network.

20 Claims, 16 Drawing Sheets

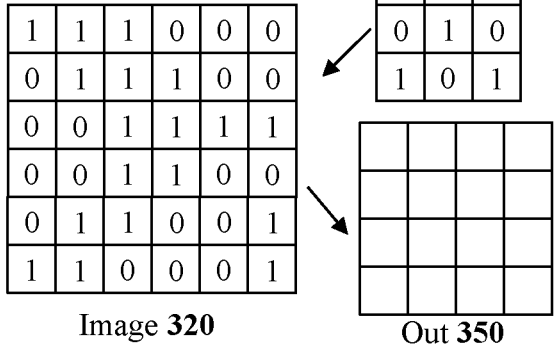
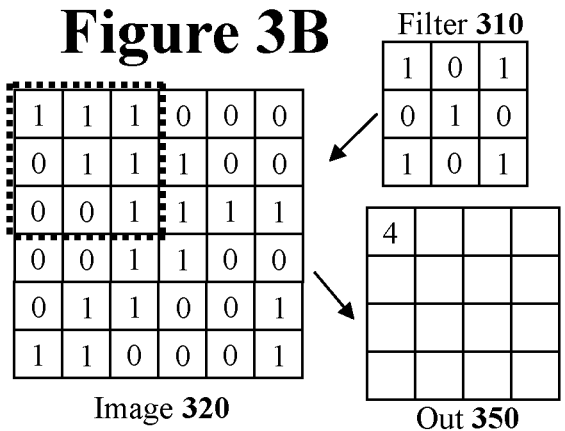
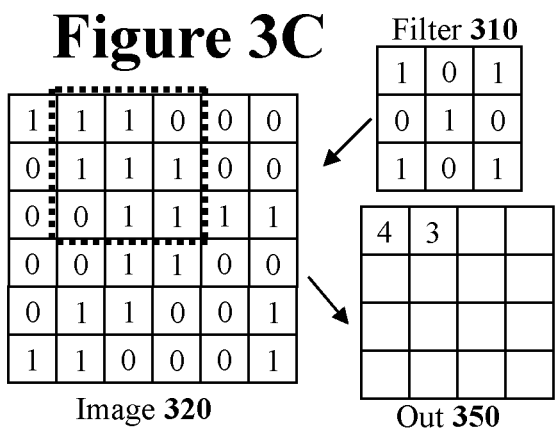
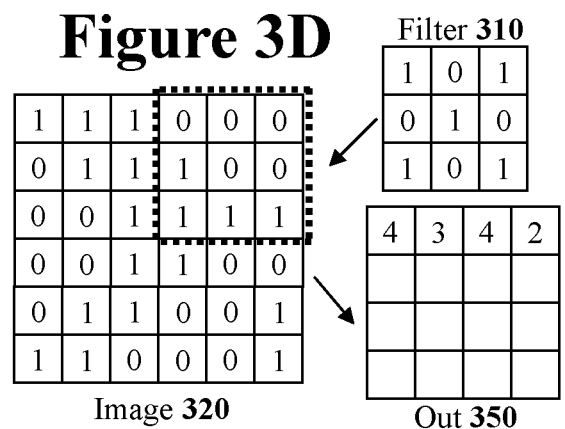
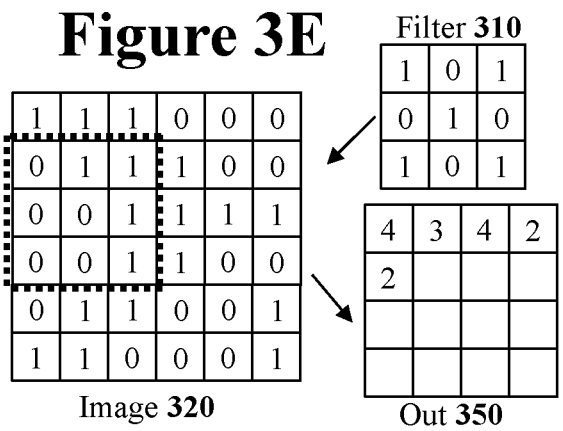
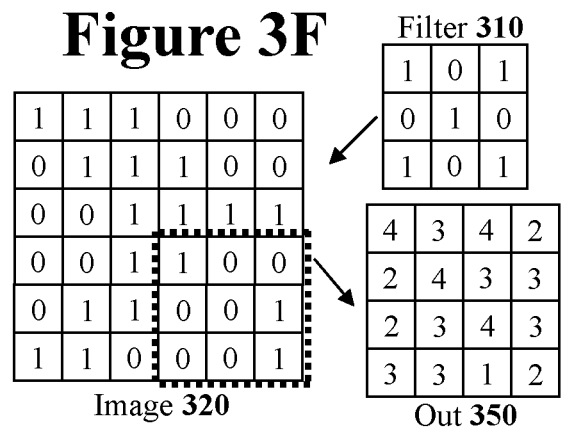

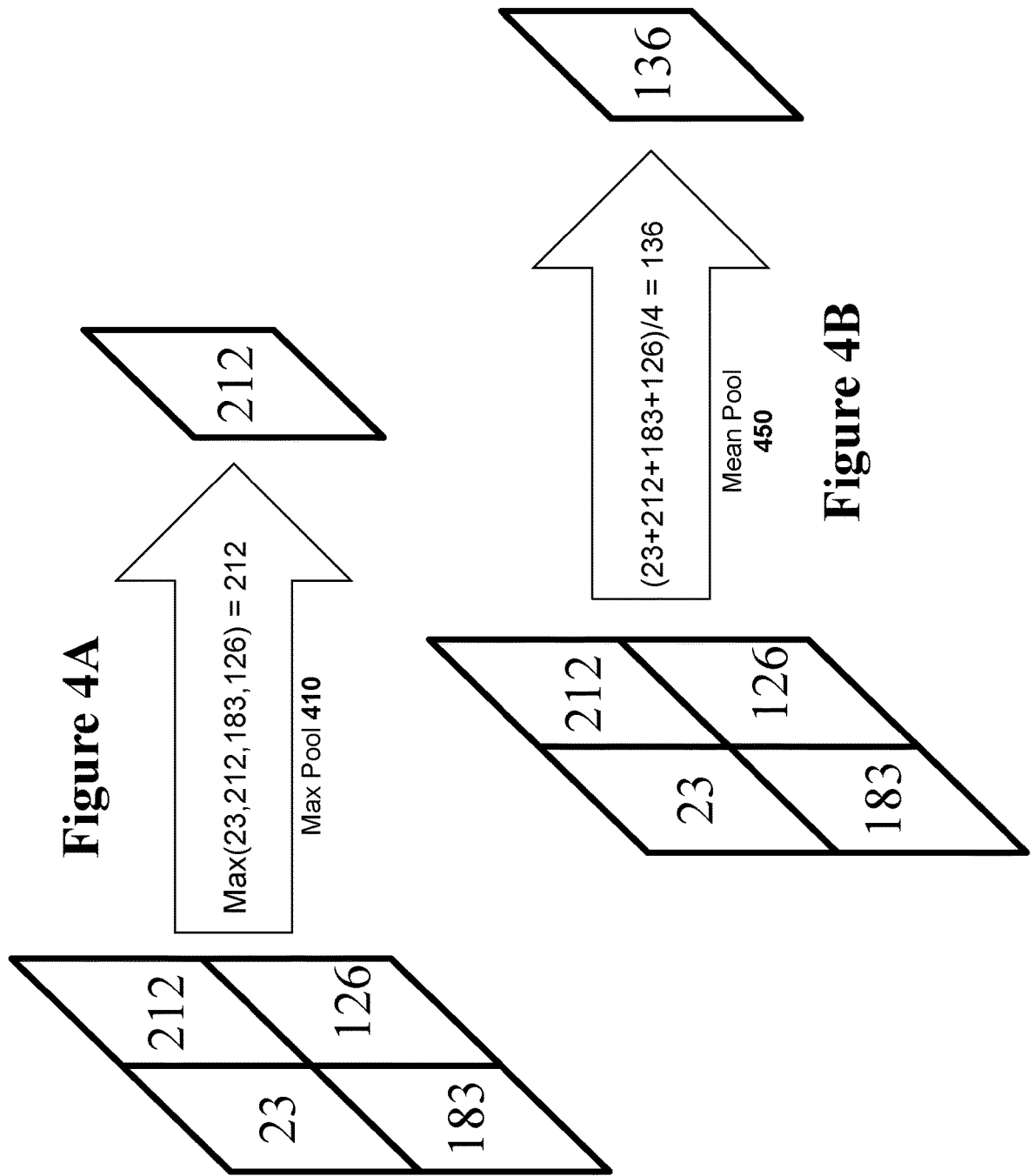

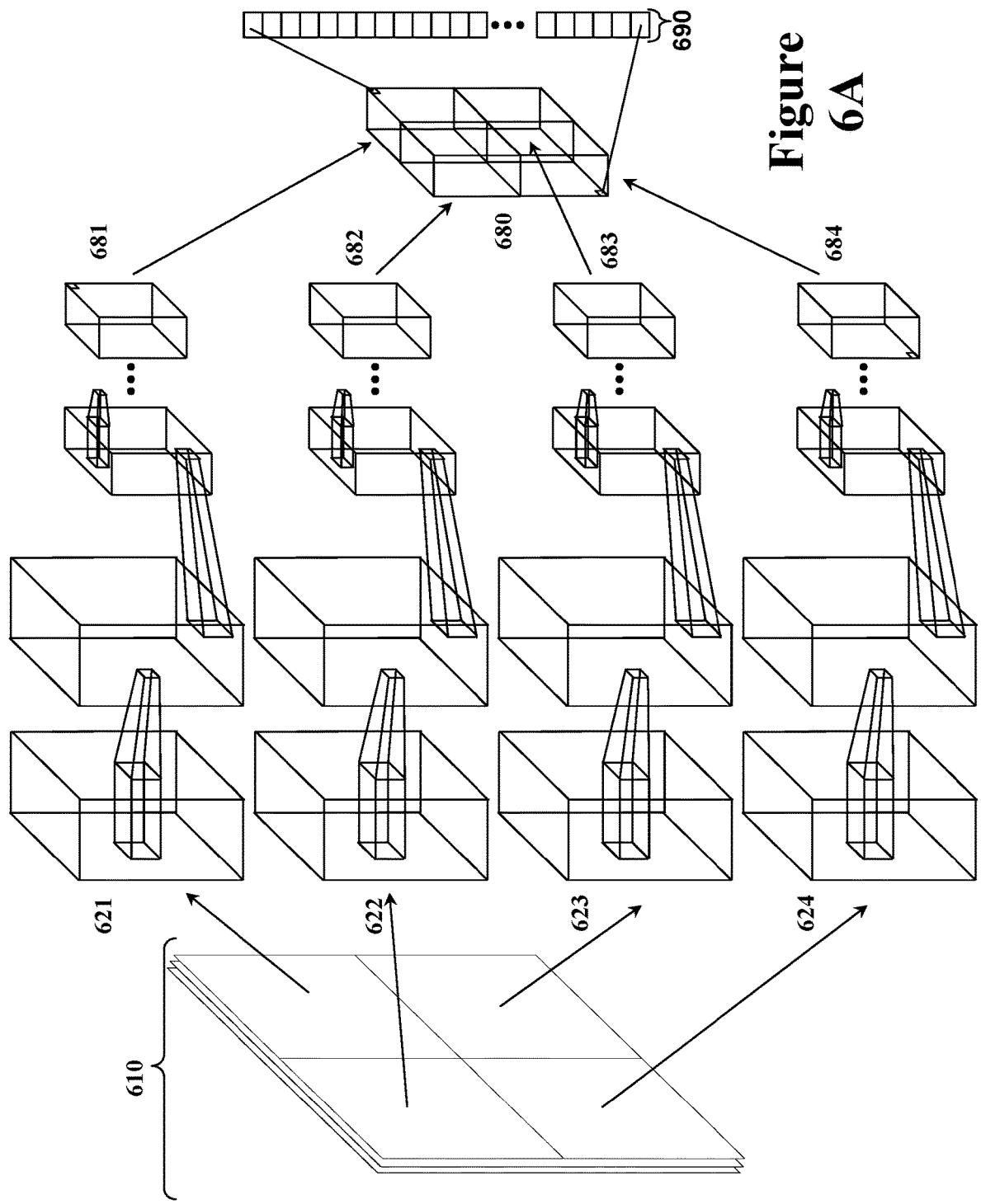

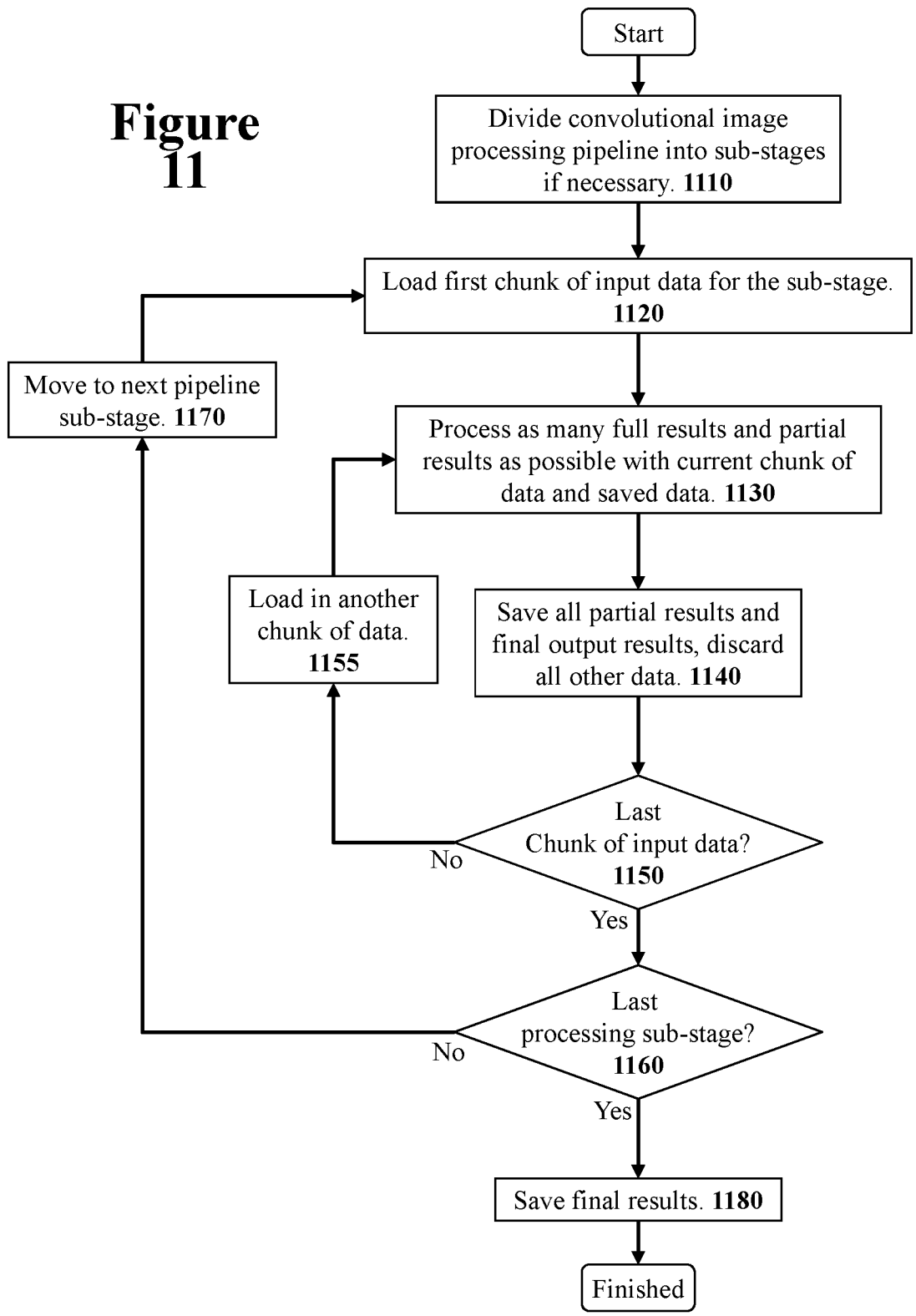

METHOD AND APPARATUS FOR EFFICIENTLY PROCESSING CONVOLUTION NEURAL NETWORK OPERATIONS

The present invention relates to the field of artificial intelligence and digital image analysis. In particular, but not by way of limitation, the present invention discloses methods and apparatus for quickly and efficiently performing convolutional neural network computations.

BACKGROUND

Artificial Intelligence is field of computer science that seeks to emulate the cognitive functions of a human mind. For example, artificial intelligence attempts to create computer systems that are capable of learning and problem solving. Many different techniques have been used to attempt to create useful artificial intelligence systems. Simple algorithms, heuristics, Bayesian networks, decision trees, support vector machines, and many other techniques have been used to obtain effective results in the field of artificial intelligence. However, at the present time one of the most popular techniques used in the field of artificial intelligence is the construction of artificial neural networks.

Artificial neural networks were originally designed based up the biological networks of neuron cells that are present within animal brains. Like biological brains, artificial neural networks operate by processing numerous input data elements (an input vector) to generate some sort of output inference just as human brains experience sights, sounds, and other sensory input from the world around them to generate inferences about that experienced world. But, just like a newly born human infant, a brand new artificial neural network cannot make useful inferences until that artificial neural network has received a good amount of training.

Before an artificial neural network is useful in a particular application, that artificial neural network first must be trained. To train an artificial neural network, sets of training data are presented to the artificial neural network and the artificial neural networks processes the training data to generate an inference from the training data. The neural network generated inference is then compared with a desired answer to determine an error amount. That error amount is then used to adjust an internal weight matrix within the artificial neural network in order to improve the inference performance of the artificial neural network. This technique of making attempted inferences, comparing the generated inference to a desired correct result, and then adjusting various parameters within the artificial neural network accordingly is known as supervised learning. By training artificial neural networks with supervised learning with large amounts of training data, artificial neural networks can eventually become accurate at generating classification inferences that are very useful in various applications.

One increasingly popular application for artificial neural network learning is the task of image recognition and classification. With image recognition and classification, digital image data is presented to an artificial neural network system and the artificial neural network system is tasked with recognizing and classifying items within the presented digital image.

An artificial intelligence system designed for an image recognition and classification task can be extremely memory and computationally intensive. For example consider the task of analyzing a conventional high-resolution image made up of 1920 by 1080 pixels wherein each individual pixel is made up of three different pixel color information values (red, green, and blue). That high-resolution digital image has 1920*1080*3=6,220,800 different data values that must be processed by the artificial neural network system. Furthermore, each individual pixel of the digital image will generally be involved in several different computations thus raising the number of computations exponentially. For full motion video artificial intelligence applications such as driving an autonomous vehicle, many individual digital video frames need to be processed each second. For example, with a 30 video frames per second system, 30*6,220,800=186,624,000 individual pixel data values must be processed by multiple computational operations each second just to perform the initial image processing and feature extraction tasks required for image recognition and classification.

In order to perform image recognition and classification, a convolutional neural network (CNN) may be used. A convolutional neural network operates in two phases: a feature extraction phase and a classification phase. The feature extraction phase of a convolutional neural network processes each digital image with a series of convolutional processing steps to extract important features from the source digital image. The feature extraction phase also reduces the amount of data into a smaller dense feature-rich data set. The feature rich data set is then processed during a classification phase in order to perform image recognition and classification.

The feature extraction phase of a convolutional neural network (CNN) generally comprises a repeated series of convolutional filter operations and pooling operations. The convolutional filter operations help extract features from the source digital image data. The pooling operations reduce the amount of data. The source digital image data may be processed by a long series of convolutional filter operations and pooling operations. Clearly, processing such large amounts of digital image pixel information in order to perform image recognition and classification very quickly becomes an extremely difficult computational task. Very large amounts of memory, memory bandwidth, and computational processing power are required to perform the series of feature extraction steps.

Although the feature extraction phase of a convolutional neural network may reduce the amount of data used in a later classification phase, all of the processing operations during the feature extraction phase of convolutional neural network generally require a very large amount memory storage, memory bandwidth, and processing power to process the digital image source data with feature extraction processing steps for later classification processing. It would therefore be desirable to identify and implement methods to most efficiently implement the feature extraction processing of a convolutional neural network.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 3A conceptually illustrates a small digital image, a convolutional filter, and an output array.

FIG. 3B conceptually illustrates a convolutional filter applied to the upper left corner of a digital image to generate an output value.

FIG. 3C conceptually illustrates the convolutional filter of FIG. 3B being applied to the digital image after striding over one pixel.

FIG. 3D conceptually illustrates a convolutional filter of FIG. 3C applied to the upper-right corner of the digital image after striding across the top rows of the digital image.

FIG. 3E conceptually illustrates the convolutional filter of FIG. 3B being applied to the digital image after striding down one pixel.

FIG. 3F conceptually illustrates a convolutional filter applied to the lower-right corner of the digital image after striding across the entire digital image.

FIG. 4A illustrates a conceptual diagram of a Max Pooling operation that may be used in a convolutional neural network.

FIG. 4B illustrates a conceptual diagram of a Mean Pooling operation that may be used in a convolutional neural network.

FIG. 6A illustrates a conceptual diagram of the feature extraction steps of the convolutional neural network of FIG. 2 wherein the original digital image source data has been divided into quadrants.

FIG. 11 illustrates a flow diagram of a cone of influence based processing method for a convolutional neural network.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to specific convolutional neural network embodiments, the techniques may be used with other implementations of convolutional neural networks. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Neural Networks Overview

Artificial neural networks (ANNs) are increasingly being used to perform many difficult reasoning tasks. Artificial neural networks were originally designed to mimic the biological networks of neuron cells employed within animal brains. Like biological brains, artificial neural networks learn from the experience of input data from the world around them and adjust internal parameters accordingly. For artificial neural networks, sets of training data are presented to the artificial neural network and the artificial neural networks attempts to make an inference. The results are compared with a desired answer to quantify an error of the inference. That quantified error is then used to adjust an internal set of weights within the artificial neural networks to improve the performance of the artificial neural network. This technique of inference attempt, error quantification, and adjustment of internal weights is known supervised learning.

Figure 1:
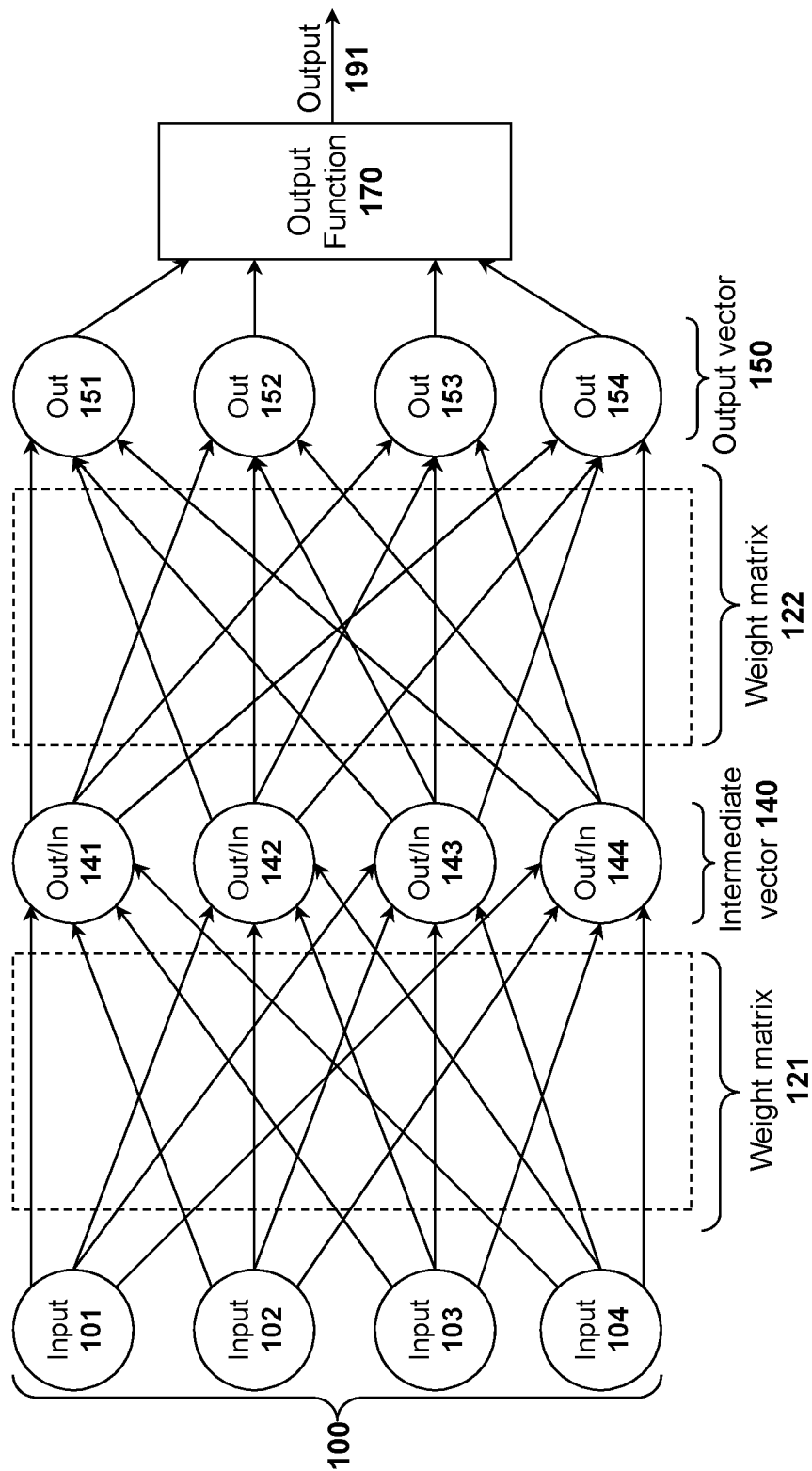
FIG. 1 illustrates a conceptual diagram of a simple two-layer artificial neural network.

FIG. 1 illustrates a conceptual diagram of a simple two-layer four-input artificial neural network (ANN) 100. Referring to the artificial neural network (ANN) of FIG. 1, input data values 101 to 104 form an input data vector 100 that is provided with training data vectors during training sessions. (Note that this is just a very simplified example neural network, a neural network may have an input data vector with hundreds or thousands of input data values.) After completing training, the input data vector 100 will be provided with new input data vectors such that the artificial neural network can perform inferences on the new input data vectors.

The input data vector 100 is processed with set of neural network layers that combine the input data values with weight matrices to create an output data vector 150. In the two-layer neural network example of FIG. 1, the first neural network layer processes the input vector 100 with a first weight matrix 121 to create an intermediate data vector 140 (data values 141 to 144) and a second neural network layer processes the intermediate vector 140 with second weight matrix 122 to create an output data vector 150 (data values 151 to 154). Again, a neural network will generally comprise many more data values and neural network layers than this simple example. Many different types of data processing may be performed using weighted matrices 121 and 122 (such as a Hadamard product, Frobenius inner product, matrix addition, etc.) however this document will focus upon the well-known linear algebra matrix product. (Note that the techniques described in this document can be used with any of these other data processing operations.)

After processing the input data vector 100 (data values 101 to 104) with the artificial neural network layers to create the output data vector 150 (output data values 151 to 154), the output data vector 150 may be combined with an output function 170 to create a final output 191 for the artificial neural network. The output function 170 may be referred to as an activation function.

Artificial neural networks may comprise many layers of weight matrices such that very complex analysis of the input data may be performed. The output data from an artificial neural network may also be used as intermediate data that is fed into additional artificial neural network layers (not shown) such that very complex hierarchical artificial neural networks may be created.

Analyzing Digital Images with Neural Networks

As illustrated in FIG. 1, an artificial neural network accepts a one dimensional input vector 100 for neural network processing. In contrast, a digital image consists of a large two-dimensional array of pixel data values. For example, a black & white digital image may consist of a single two-dimensional array of pixel grayscale values. Similarly, a color digital image may consist of three separate two-dimensional arrays of red, green, and blue pixel color values. Therefore, before analyzing a digital image with an artificial neural network, a digital image must first be converted into some type of one-dimensional vector form for processing with a typical artificial neural network.

A very simple method of converting a two-dimensional digital image into a one-dimensional vector is to simply "flatten" the digital image by converting all of the rows of two-dimensional array into one very long one-dimensional data vector made up of concatenated rows of pixel data from the original two-dimensional image. This technique has been used in some neural network systems for image analysis but the results from such systems are generally poor. This simple technique of flattening the data removes some important embedded information such as the adjacency of pixels in the same column. Furthermore, the flattened image data will be an extremely long one-dimensional vector. For example, a 1920 by 1080 high-resolution image made up of red, green, and blue pixel color components would create a long one dimensional array with 1920*1080*3=6,220,800 data values in it. Such a long one-dimensional vector is impractical. Thus, other systems have been developed for converting source digital images into a one dimensional data vector for processing by an artificial neural network.

One of the best systems of converting two-dimensional digital images into a one-dimensional vector for neural network processing is the use of a convolutional neural network (CNN). With a convolutional neural network, each source digital image is processed with a series of feature extraction steps that attempt to extract important feature information from the source digital image and reduce the size of the data. The output of the feature extraction steps is generally a dense three-dimensional data array. That array may be processed with pooling step and then flattened into a one-dimensional data vector. However, due to the feature extraction processing steps, the one-dimensional data vector provides much better results than a two-dimensional digital image simply flattened into a one-dimensional data vector.

Convolutional Neural Networks Overview

Figure 2:
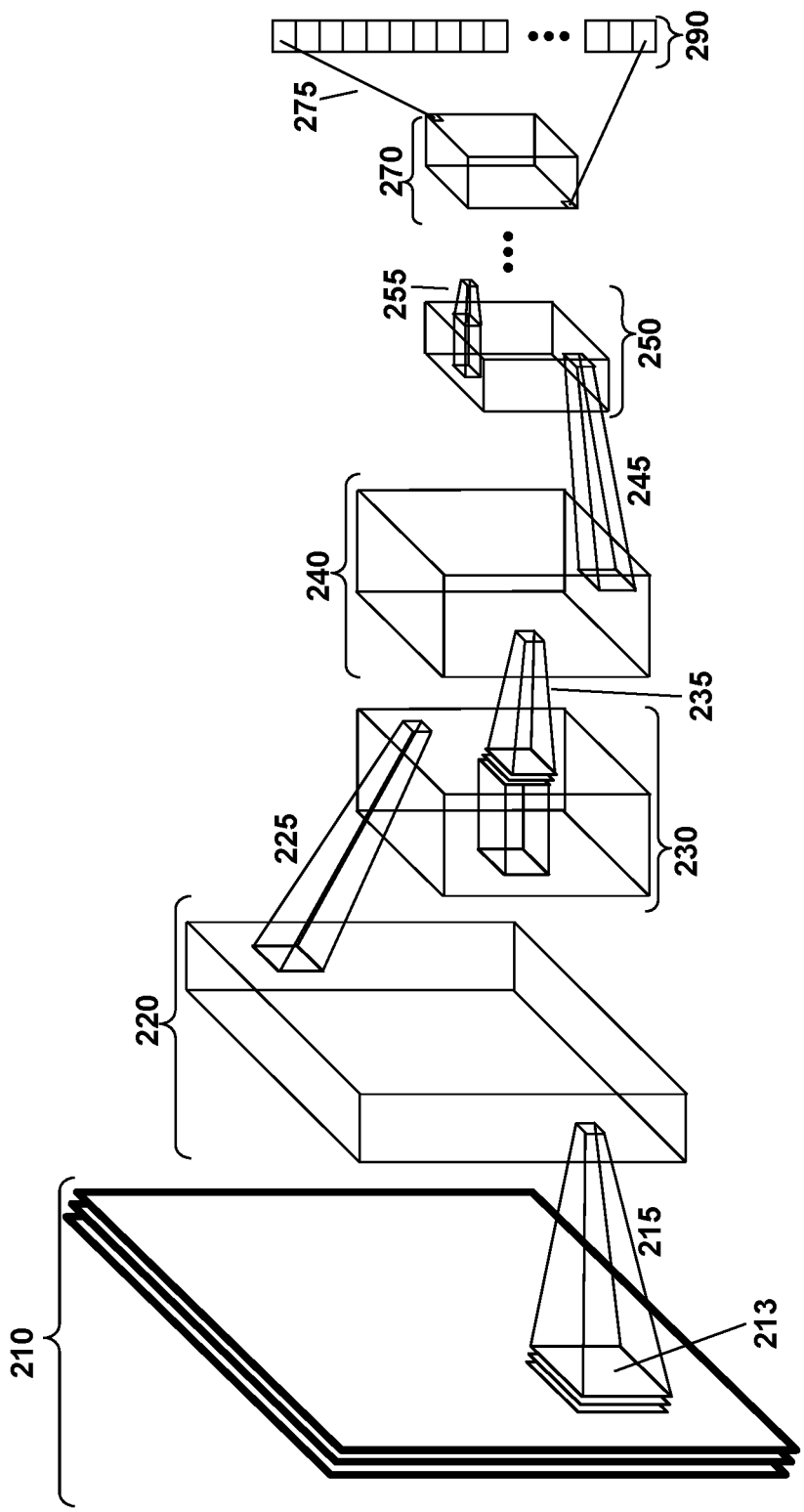
FIG. 2 illustrates a conceptual diagram of the feature extraction steps for an example convolutional neural network.

FIG. 2 illustrates a conceptual diagram of the feature extraction processing steps for an example convolutional neural network. On the very left-hand side of FIG. 2, three two-dimensional arrays 210 of red, green, and blue pixel data values represent a color digital image that is to be processed. The digital image data is then processed by a series of processing steps to extract image features and reduce the amount of data. The output of the feature extraction processing steps is the one-dimensional data vector 290 on the right-hand side of FIG. 2. The one-dimensional vector 290 can then be processed by an artificial neural network (ANN) like the ANN illustrated in FIG. 1 to perform classification.

In the example of FIG. 2, the source two-dimensional digital image arrays 210 are first convolutional processed 215 with a series of convolutional filters 213. The convolutional filters 213 help extract features out of the source digital image arrays 210. There are a wide variety of convolutional filters for tasks such as edge detection, blurring, sharpening, etc. Several different convolutional filters may be applied to extract different features from the source digital image arrays 210. The output of the convolutional processing with several convolutional filters 213 is a three-dimensional data array 220.

A simple example of applying a convolutional filter to a digital image array is presented with reference to FIGS. 3A to 3F. Referring to FIG. 3A, a small six pixel by six pixel digital image 320 is to be processed with a three by three convolutional filter 310 with the output to be placed into a new output array 350. To process the image, the convolutional filter 310 is applied to sections of the digital image 320, the corresponding data values are multiplied, and the sum of the multiplication operations is place into the output array 350. For example, FIG. 3B illustrates the convolutional filter 310 applied to the upper-left corner of digital image 320, the corresponding data values are multiplied, and the sum of the multiplications is then placed into a corresponding location (the upper right corner) of the output array 350. In this example, the upper-left, upper-right, center, and lower-right positions of the convolutional filter 310 create multiplication outputs of "1" that are then all summed together to place an output value of "4" in the output array 350.

Note that each convolutional operation may also include a rectifier operation. Specifically, a rectified linear unit (ReLu) may apply a function to the output of each convolution operation. A typical ReLu function is the f(x)=max (0,x) but many different ReLu functions may be used. Thus, each convolutional operation mentioned in this document may be comprised of both a convolution operation and a ReLu operation.

The convolutional filter is then applied to the remainder of the digital image 320. In this example, the convolution operation uses a "stride" of one such that the convolutional filter 310 is moved over one pixel as illustrated in FIG. 3C to create a convolution output of "3" in the next position of the output array 350. (If a stride of three was used, the next position of convolutional filter 310 would have been three pixels over as illustrated in FIG. 3D.) The convolutional filter 310 continues to stride across the digital image 320 generating convolution output values that are placed into the output array 350 until the entire first row of the output array 350 is filled as illustrated in FIG. 3D.

After completing the first row as illustrated in FIG. 3D, the convolutional filter 310 strides down one pixel row and is applied to the left-most portion of the second, third, and forth rows as illustrated in FIG. 3E. The output from that convolutional operation ("2") is placed in the left-most entry of the second row of the output array 350. The convolutional filter 310 continues to stride across and down the digital image 320 until convolutional filter 310 reaches the very bottom-right corner of the digital image 320 and thus completes the output array 350.

Note that this is just a very simple example of a convolution operation and that there are many different variations. A padding of zeros may be placed around the perimeter of the digital image 320 such that the output array 350 is the same size as the digital image 320. The convolutional filter maybe larger or smaller, a different shape, and contain different constant values within it. Furthermore, many other types of digital image processing and feature extraction techniques may be used to create different output data values in the output array 350.

Returning back to FIG. 2, the output of the convolutional operations 215 are collected in the three-dimensional intermediate array 220. Several different convolutional filters may be applied thus creating several output arrays such that three-dimensional output array 220 becomes thick with multiple stacks of output arrays. To reduce the amount of data, pooling operations may be applied. FIG. 2 illustrates a first pooling operation 225 that reduces three-dimensional intermediate array 220 into a smaller three-dimensional intermediate array 230.

Pooling operations generally reduce the data by averaging together sections of data or selecting one particular data element from a collection. FIGS. 4A and 4B illustrated two possible four to one pooling operations that receive four data values as inputs and output one data value as output. FIG. 4A illustrates a Max Pooling 410 operation wherein the maximum data value from a set of four data values is output. FIG. 4B illustrates a Mean Pooling 450 operation wherein the mean of four data values is calculated and output as a data value.

Referring back to FIG. 2, three-dimensional intermediate array 230 may be processed with an additional convolution operation step 235 to create another three-dimensional intermediate data array 240. The convolution operation step 235 may extract higher level features from within the data of three-dimensional intermediate array 230.

Next, another pooling operation 245 may be used to further reduce the data. As illustrated in FIG. 2, pooling operation 245 reduces three-dimensional intermediate array 240 into smaller three-dimensional intermediate data array 250. A series of additional convolution, pooling, and/or other operations may be performed on the data ultimately yielding a final three-dimensional data array 270.

The final three-dimensional data array 270 contains a concentrated feature rich data set. To prepare the feature rich data set of the final three-dimensional data array 270 for classification analysis by an artificial neural network, the data within final three-dimensional data array 270 is flattened into a one-dimensional data vector 290. The one-dimensional data vector 290 can then be analyzed with an artificial neural network (ANN) such as a larger one of the ANN illustrated in FIG. 1.

Memory Consumption with Convolutional Neural Networks

Figure 5:
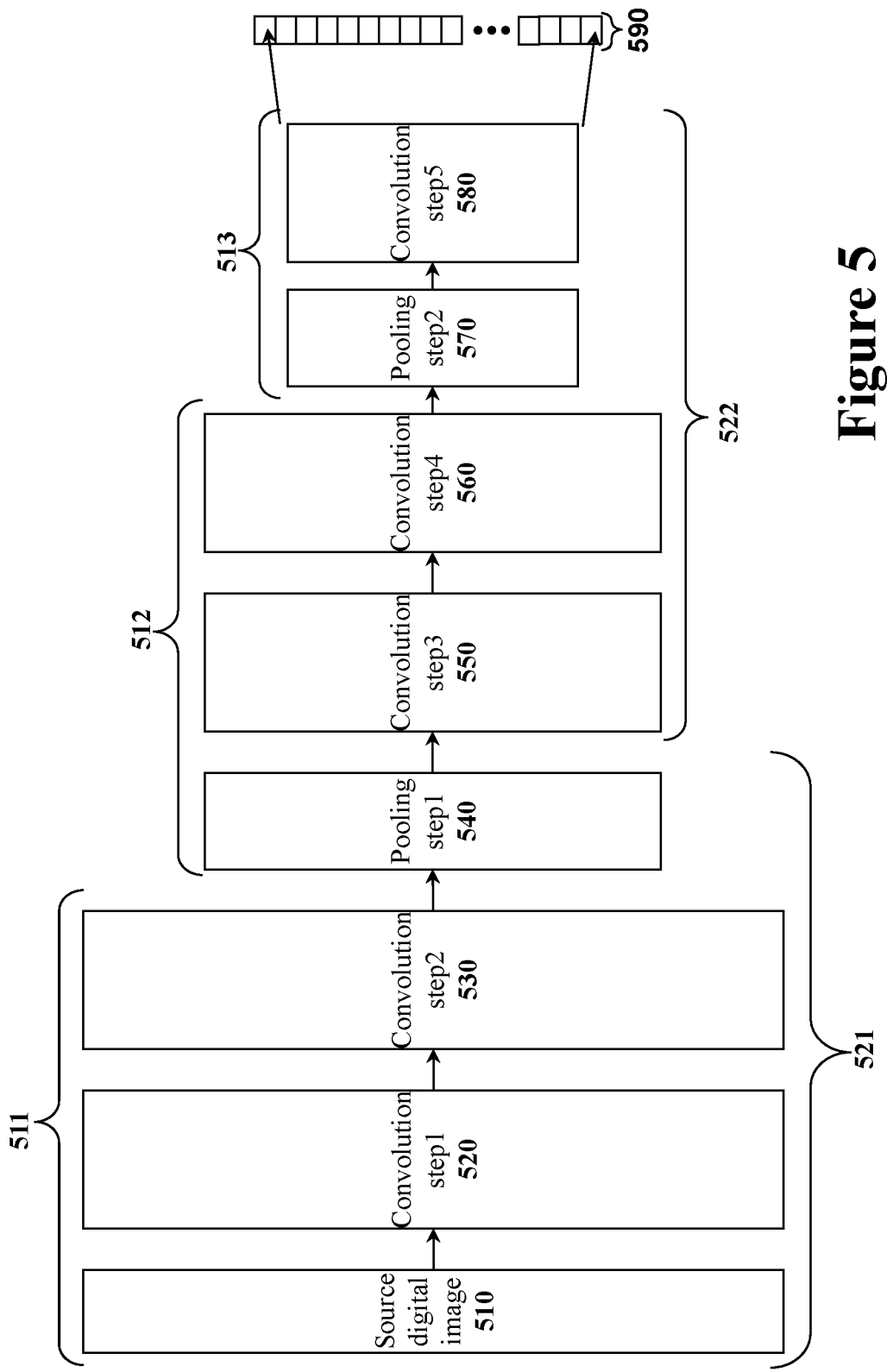
FIG. 5 illustrates a block diagram of feature extraction steps for an example convolutional neural network that includes five different convolutional steps and two pooling steps.

As illustrated in the example convolutional neural network (CNN) illustrated in FIG. 2, a convolutional neural network uses a long series of feature extraction processing steps to extract features from digital images. FIG. 5 illustrates a block diagram of an example set of feature extraction steps for another example of a convolutional neural network. The example convolutional neural network of FIG. 5 starts with a source digital image 510 that is first processed through two convolutional processing steps (520 and 530). Next, a first pooling step 540 reduces the amount of data. The reduced data is then processed by two more convolutional processing steps (550 and 560). Another pooling step 570 further reduces the amount of data. Finally, one more convolutional processing step 580 before the feature rich data is flatted into a one-dimensional vector 590 for classification processing by an artificial neural network.

In typical system, all of these feature extraction steps are each fully completed, step by step, in this order. Specifically, first the source digital image 510 is processed by convolutional step1 520 to create a first full intermediate data array. That intermediate data is then fully processed by convolutional step2 530 to create another intermediate data array. That intermediate data array is then reduced by pooling step1 540 to create a smaller intermediate data array. Next, that smaller intermediate array is fully processed by convolutional step3 550 to create another intermediate data array. The CNN system proceeds along in this manner, fully processing the data during each processing step and creating new data arrays until a final data array is created after convolutional step5 580. The final data array is then flattened into a one-dimensional vector 590 for classification processing by an artificial neural network.

This method of processing the digital image data to extract feature information is very memory intensive. Large amounts of digital data must be continually moved from memory, into computational units, and then back to memory. Thus, this feature extraction processing requires large amounts of memory space and memory bandwidth. A significant amount of time performing this type of digital image processing and feature extraction is just spent loading data from memory for processing and then storing processed data back into memory. Thus, just moving data back and forth between memory and computational units becomes a significant performance bottleneck that can severely limit computational performance and energy efficiency of the convolutional neural network.

Caching Data to Improve Performance

The traditional technique of improving performance in a computer system that has become performance limited due to a large amount of memory operations is to add some type of local cache memory to the computer system. The local cache memory is added proximate to the computational circuits such that data is frequently accessed from the local cache memory and the number of accesses to a main memory can be reduced. For example, microprocessors frequently add multiple levels of high-speed cache memory that are closely coupled to the microprocessor and/or within the microprocessor. In this manner, frequently accessed instructions and data can be quickly read from the high-speed cache memory and stored back to that high-speed cache memory without incurring the time and energy penalty of accessing the main memory system of computer system.

This same technique can be used for processing systems designed to handle convolutional neural networks. Specifically, a limited amount of local cache memory can be implemented proximate to the computational circuits that perform mathematical and logical operations on the data associated with the convolutional neural network. In this manner, the performance of such convolutional neural network systems may be improved. Note that this document will discuss a "local cache memory" or a "local memory"; this local cache memory may be implemented in many different forms. It may comprise local static random access memory (SRAM) added to a processor system, it may comprise a multi-tiered cache memory system, or it may comprise any other type of local memory system added to improve performance over a larger main memory system.

Although simply adding some local cache memory system without any other changes may help to some degree, it may be difficult to significantly improve the performance of the feature extraction processing phase associated with convolutional neural networks. As illustrated in FIGS. 2 and 5, convolutional neural networks may operate on very large data sets starting with high-resolution digital images that are then processed with multiple convolutional filters through multiple convolutional processing steps creating several intermediate data arrays (220, 230, 240, 250, etc.) before generating a final output vector 290. Working serially through such large data sets will generally still require large number of accesses to external memory storage and thus the improvement gained by adding small local cache memory to the system may be very limited.

Partitioning Images into Sections for Convolutional Neural Networks

As set forth in the previous section, the very large data sets involved in convolutional neural networks can greatly limit the performance gains that may be achieved by adding a local cache memory system since the main memory system will still be required to store the very large data arrays involved in a convolutional neural network. Thus, one technique that may be used to improve performance in conjunction with a local cache memory system is to reduce the size of the data set being operated on.

FIG. 6A illustrates a conceptual diagram of the feature extraction steps of the convolutional neural network of FIG. 2 wherein the original digital image source data 610 has been divided into four quadrants. The four quadrants 621, 622, 623, and 624 may then each be individually processed with the feature extraction steps of the convolutional neural network until a final data array is created for each quadrant. Specifically, source digital image quadrants 621, 622, 623, and 624 may be processed into final data array quadrants 681, 682, 683, and 684 respectively. The final data array quadrants 681, 682, 683, and 684 can be then combined together into a full final data array 680. Full final data array 680 may then be flattened into one-dimensional vector 690 for classification processing by a traditional artificial neural network like the one illustrated in FIG. 1.

Dividing up the digital image data for the feature extraction processing steps of a convolutional neural network is not as clean as illustrated in FIG. 6A. For example, the boundaries between the different quadrants are not sharp lines. Instead, the quadrants must overlap each other as illustrated in FIG. 6B in order to generate the proper results. This means that some calculations on the borders between the different quadrants will be duplicated thus increasing the number of computations performed. However, the time savings from the use of local cache memory may more than compensate for these additional calculations.

Figure 6C:
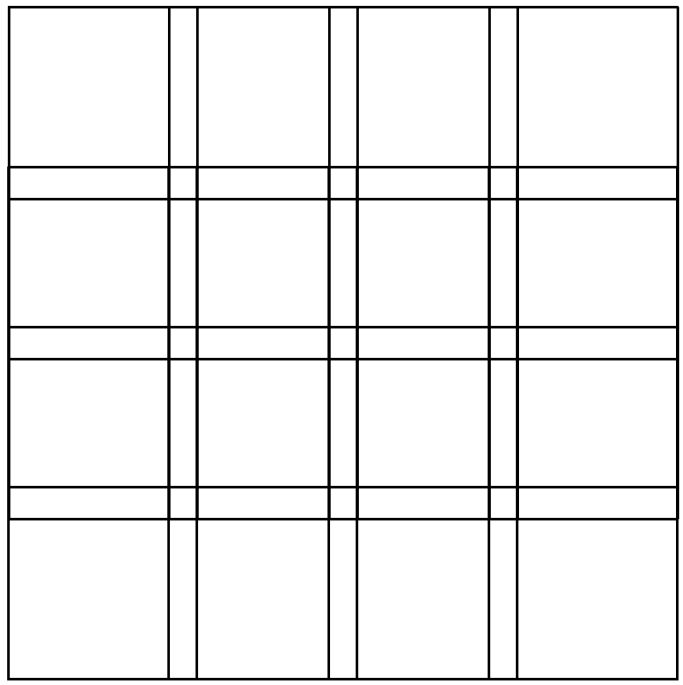
FIG. 6C illustrates digital image source data that has been divided into sixteen overlapping areas.
Figure 6B:
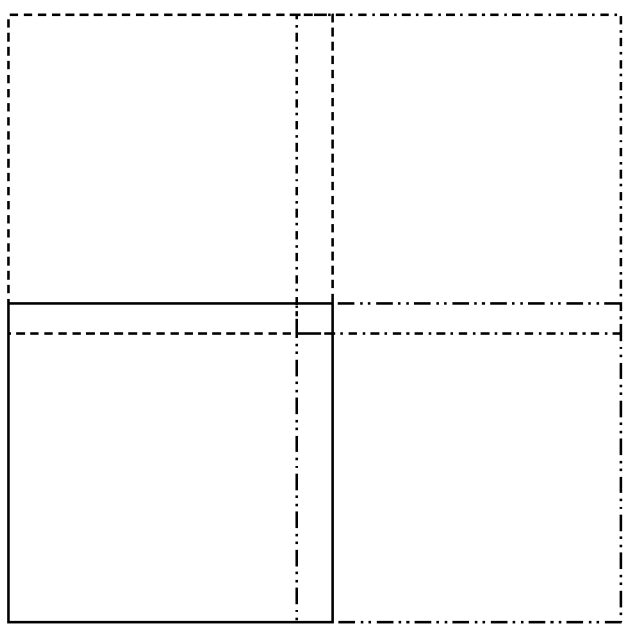
FIG. 6B illustrates digital image source data that has been divided into four overlapping quadrants.

Another issue is that although the simple example of FIGS. 6A and 6B illustrate the digital image source data divided into four quadrants, a real implementation may require dividing the source digital image data into many smaller areas in order to have all the data digital image data and later intermediate data arrays fit within the smaller local cache memories. For example, FIG. 6C illustrates a digital image source data that has been divided into sixteen overlapping sub-areas such that every sub-area can fit within a local cache memory system. However, as is apparent from FIG. 6C, this greatly increases the amount of overlapping area such that many more redundant calculations may need to be performed.

Cone of Dependency and Cone of Influence

One of the keys to convolutional neural network feature extraction is to extract image feature information formed by patterns in nearby pixels. For example, nearby pixels may form image features such as edges, an eye, a letter, a shape, a number, a face, etc. This is why the convolutional filters that are applied that combine nearby pixel information to extract feature information. Combining pixels distant from each other in an image does not yield much useful feature information.

Figure 7A:
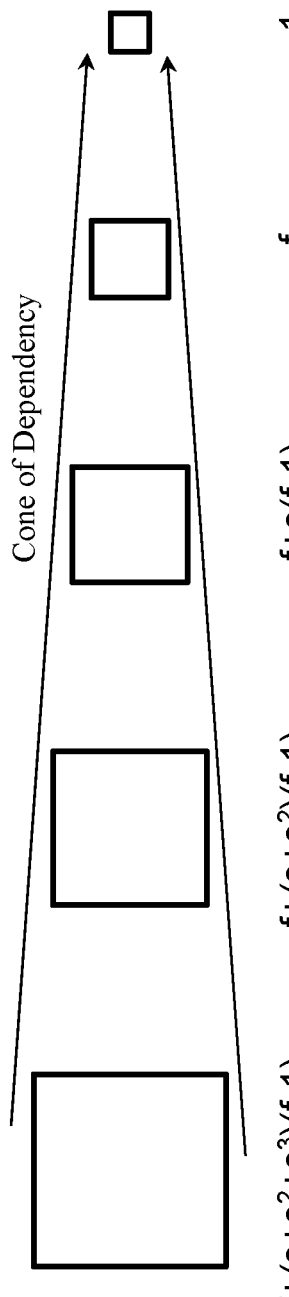
FIG. 7A illustrates the cone of dependence of a single data value on the right being dependent on more and more data values from every earlier convolutional step.

Since only nearby pixel information is combined together with a series of convolutional operations, this creates a "cone of dependency" from nearby data in all the earlier processing steps. For example, in a convolutional neural network that uses an f by f convolutional filter, every data value depends only on f by f data values from the prior step. As the number of convolutional processing steps grows, this grows into a cone of dependence on larger numbers of data values from every earlier convolutional step. FIG. 7A illustrates the cone of dependence of a single data value on the right being dependent on more and more data values from every earlier convolutional step for a convolutional neural network with an f by f filter with a stride of s.

Figure 7B:
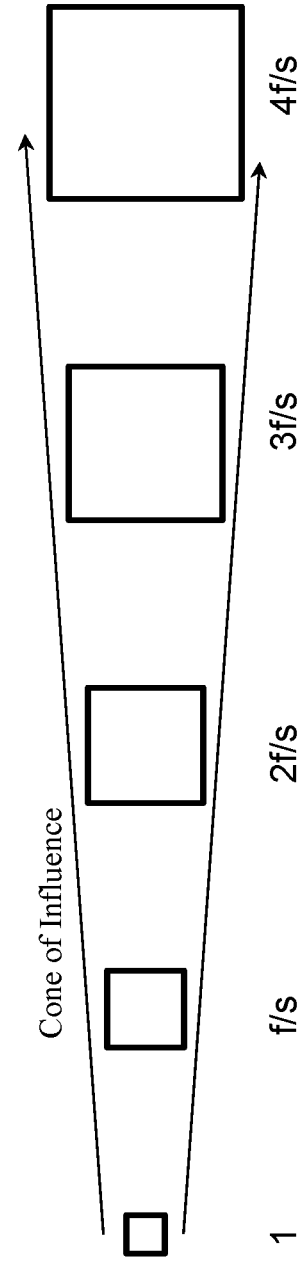
FIG. 7B illustrates a cone of influence wherein a single data pixel on the left influences more and more data values in every successive convolutional step.

This phenomenon can also be viewed in the other direction. Specifically, a single data pixel from a digital image influences the output of a larger and larger number of intermediate data values in successive convolutional steps. FIG. 7B illustrates this "cone of influence" starting from a single data pixel on the left influencing more and more intermediate data values in every successive convolutional step for a convolutional neural network with an f by f filter with a stride of s.

As illustrated in FIG. 7B, each pixel from a digital image affects a larger number of intermediate data values in every successive convolutional step. However, the amount of influence is ultimately limited such that each pixel only affects a small number of nearby data values in later steps and does not affect the many more intermediate data values distant from a source pixel. And as illustrated in FIG. 7A, a final data value on the right side is only dependent on a small subset of pixels from the source digital image.

As illustrated with FIGS. 7A and 7B, one does not need to have all of digital image pixel data available to calculate a final data output value after a series of convolutional steps. Instead, as illustrated in FIG. 7A, only the limited number source pixels that a final data value depends on need to be available. This can be used to improve convolutional neural network calculation efficiency by keeping only a small amount of pixel data in a local cache memory in order to quickly calculate through several convolutional layers to generate intermediate or even final convolutional neural network data output values. Thus, this technique can greatly reduce the amount of reads from and writes to a main memory system and therefore greatly improve convolutional neural network performance.

To most clearly illustrate these improved feature extraction processing techniques, this document will switch from two-dimensional data examples to one-dimensional examples. The one-dimensional based examples simplify the drawings to more clearly illustrate the techniques but the very same principles can be applied to normal feature extraction processing from two-dimensional digital images. As illustrated in FIG. 2, even just a high level conceptual diagram of the convolutional neural network feature extraction processing steps is complex without data representations. FIGS. 8A to 8D conceptually illustrate a small convolutional neural network with three feature extraction steps that operates in a traditional manner on a one-dimensional source data vector 810. Each convolutional step uses a one-dimensional convolutional filter (813, 823, and 833) that is 3 data units wide and creates a single output data value. Furthermore, in this one-dimensional convolutional neural network example the 3-data-wide convolutional filters will be moved with a stride of one ("1").

Figure 8A:
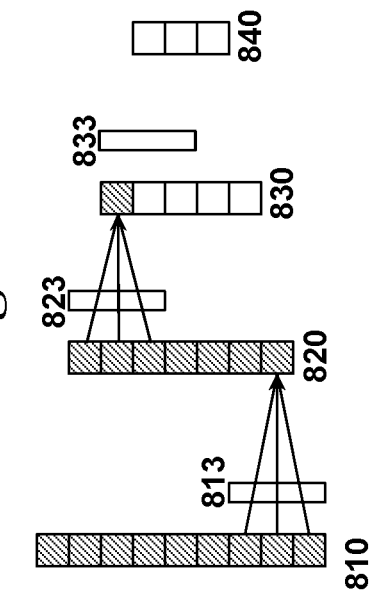
FIG. 8A illustrates a one-dimensional example of a first convolution operation on the first three data values in source data array with a convolutional filter creating a first intermediate data value in an intermediate array.
Figure 8B:
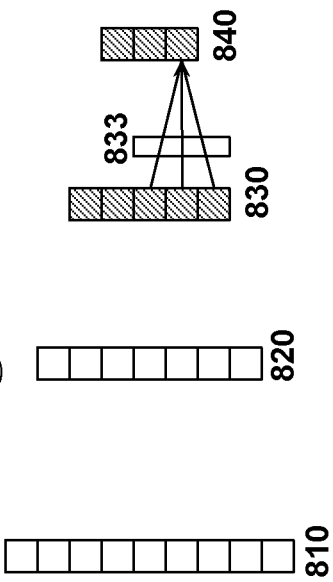
FIG. 8B illustrates the one-dimensional convolution example of FIG. 8A after processing the entire source data array to create a full set of intermediate data values in an intermediate array.

Referring to FIG. 8A, the traditional convolution processing operation begins by performing a first convolution operation on the first three data values in source data array 810 with convolutional filter 813 to create a first intermediate data value in intermediate array 820. The convolutional filter 813 then moves down one pixel at a time (stride of 1) calculating successive intermediate data values. After striding the convolutional filter 813 down the entire source data array 810 the intermediate array 820 will be filled with data values as illustrated in FIG. 8B.

Figure 8C:
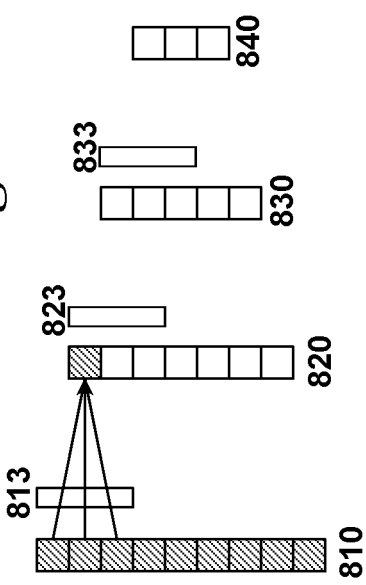
FIG. 8C illustrates the one-dimensional convolution example of FIG. 8B after processing an entire intermediate array to create another full set of intermediate data values in another intermediate array.

After completing the first convolution layer, the second convolution layer can then begin feature extraction processing the intermediate data values in intermediate array 820. FIG. 8B illustrates convolutional filter 823 being applied to the first three data elements in intermediate array 820 to create a first data value in the next intermediate array 830. The system then has convolutional filter 823 stride down intermediate array 820. FIG. 8C illustrates the situation after striding the convolutional filter 823 down through the entire intermediate array 820 creating all the data values in intermediate array 830.

Figure 8D:
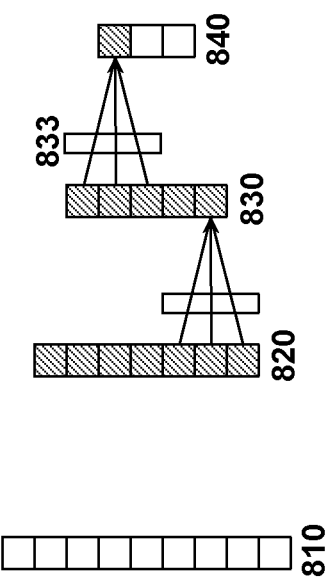
FIG. 8D illustrates the one-dimensional convolution example of FIG. 8C after processing an entire intermediate array to create a full set of final output data values in a final data array.

At this point the final convolutional feature extraction step can begin operation with filter 833. FIG. 8C illustrates convolutional filter 833 being applied to the first three data elements in intermediate array 830 to create a first data value in the next intermediate array 840. Finally, FIG. 8D illustrates the completed operation after striding the final convolutional filter 833 down the entire intermediate array 830 to generate the final output data values in the final array 840.

Referring to the one-dimensional convolutional neural network feature extraction processing set forth in FIGS. 8A to 8D, the system will either require very large amounts of data to be stored in local cache memory (often impossible) or require large amounts of data to be moved in and out of main memory storage. Thus, the convolutional neural network feature extraction processing set forth in FIGS. 8A to 8D will be inefficient and slow. To improve on convolutional neural network feature extraction processing, this document discloses systems that take advantage of the cone of dependency and cone of influence phenomenon described with reference to FIGS. 7A and 7B.

Cone of Dependency Based Processing

As described with FIGS. 7A and 7B each intermediate data value or final output data value of convolutional neural network image processing only depends on a limited set of nearby source pixels. Therefore, if one keeps those nearby pixels in local cache memory then one can quickly and efficiently calculate the final output data values of convolutional neural network feature extraction processing by reducing costly main memory accesses. Furthermore, by adding more nearby pixels as needed and dropping other pixels and data no longer needed, a cone of dependency based processing system can calculate final output data values very efficiently without large numbers of repeated accesses to a main memory system. These "cone of dependency" and "cone of influence" techniques may be combined with the technique of dividing images into subareas as described with reference to FIGS. 6A, 6B, and 6C to ensure that all of the data needed for feature extraction processing will remain in local cache memory such that the feature extraction processing can be performed quickly and efficiently.

Figure 9:
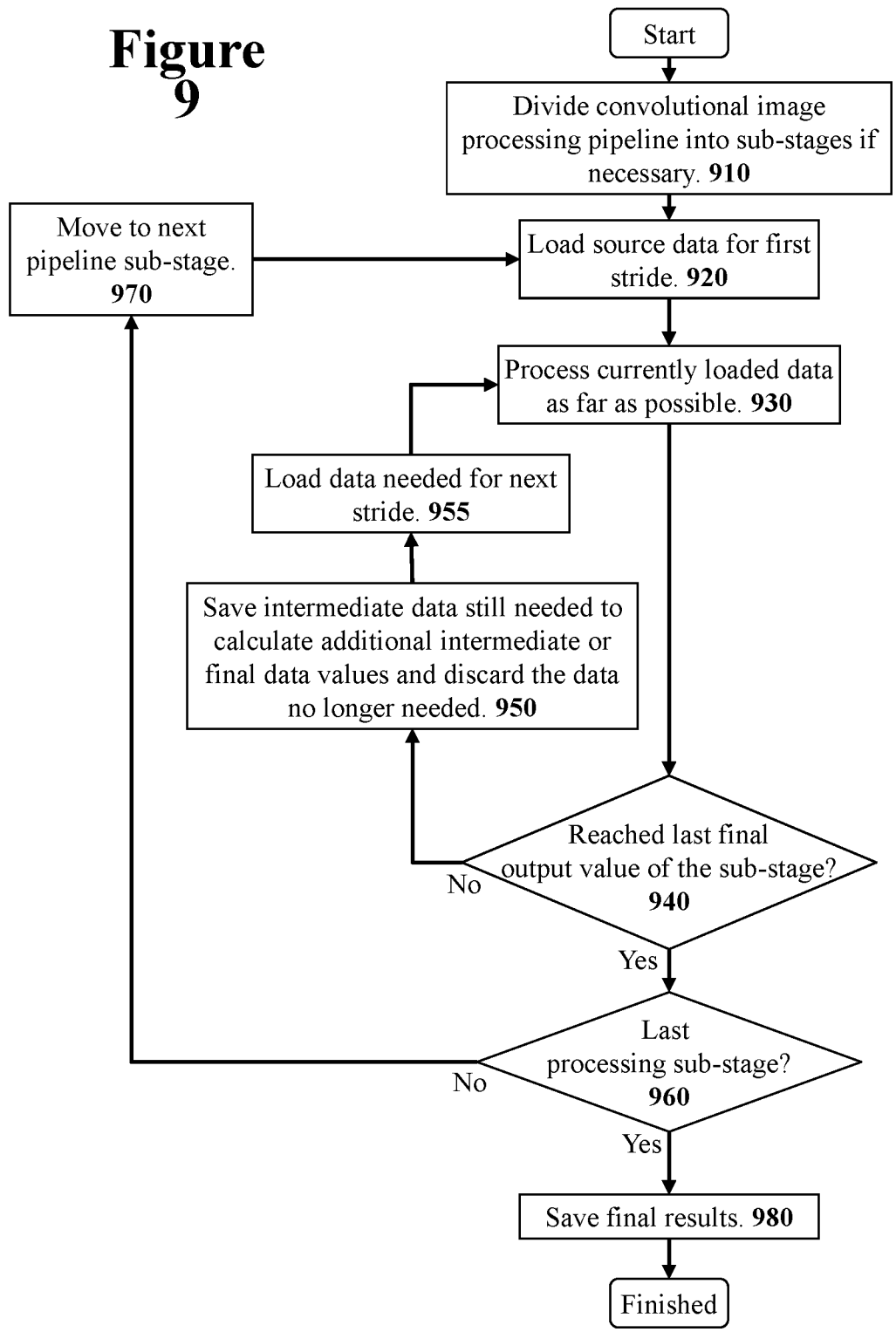
FIG. 9 illustrates a flow diagram of a cone of dependency based processing method for a convolutional neural network.

A cone of dependency based feature extraction processing technique will be described with reference to the flow diagram of FIG. 9 and the conceptual processing diagrams of FIGS. 10A to 10G. Referring to the flow diagram of FIG. 9, a first step that may be taken is to divide a convolutional neural network feature extraction processing pipeline into sub-stages if necessary. Referring back to the example convolutional neural network image processing pipeline of FIG. 5, it may be difficult to compute an entire long convolutional neural network (CNN) processing pipeline in a single processing pass. Thus, the CNN feature extraction processing pipeline may be broken into three sub-stages 511, 512, and 513 or the feature extraction processing pipeline may be broken into two sub-stages 521 and 522. Or the feature extraction processing pipeline might not be broken into sub-stages at all if the entire feature extraction pipeline can be performed within local cache memory.

Figure 10A:
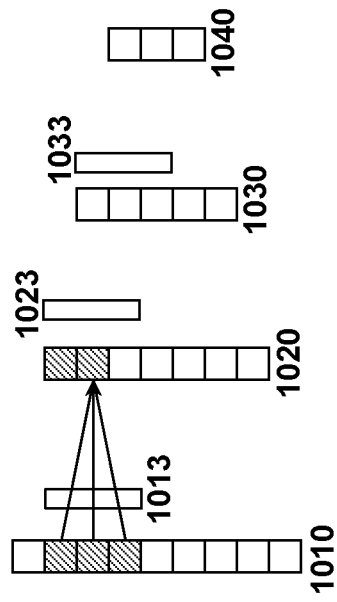
FIG. 10A to 10G illustrate cone of dependency processing of an example one-dimensional convolutional neural network.

Referring back to FIG. 9, the system then loads in the source data for the first convolutional stride at step 920. This is illustrated in conceptual processing diagram of FIG. 10A as the first three pixels of data loaded in digital image array 1010. Next, at step 930, the system processes the currently loaded data as far as possible along the feature extraction processing pipeline. As illustrated in FIG. 10A the CNN processing system can only perform that one single convolution operation with filter 1013 to create an intermediate data value in intermediate array 1020.

Figure 10B:
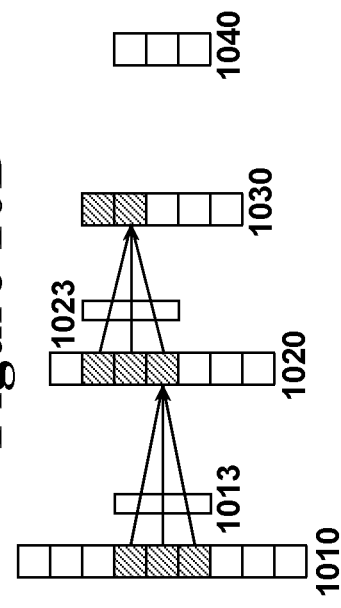

The system then proceeds to step 940 where it determines if the last final output value has been calculated for the sub-stage. That would require all three values of final output array 1040 to be filled with final calculated data and thus is clearly not the case yet. Thus, the system proceeds to step 950 where the system saves in the local cache memory all intermediate data still needed to calculate additional intermediate or final data values and also discards the data values no longer needed. In this case, the top-most pixel in digital image array 1010 is no longer needed to calculate any additional intermediate or final data values and thus is discarded as illustrated in FIG. 10B.

The system then loads additional pixel data needed for the next stride at step 955. This means that the fourth from the top pixel in digital image array 1010 is loaded with valid data. The system then returns to step 930 where it again attempts to process the currently loaded data as far as possible though the feature extraction pipeline. As illustrated in FIG. 10B, this again means that the system can only perform a single convolution operation with filter 1013 to create a second intermediate data value in intermediate array 1020.

Figure 10C:
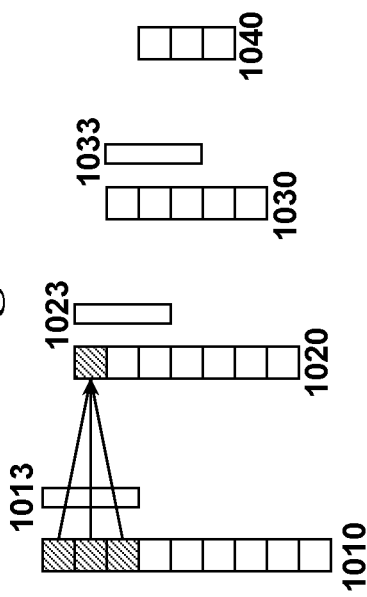

The CNN processing system will then continue to proceed through the loop of steps 930, 940, 950, and 955 until processing for the current sub-stage is complete. In the next iteration of the loop, a third data value is calculated from pixel data in digital image array 1010 with filter 1013 to create a third intermediate data value in intermediate array 1020 as illustrated in FIG. 10C. Now with three calculated intermediate data values in in intermediate array 1020, filter 1023 can operate on the three intermediate data values in intermediate array 1020 to calculate a first intermediate result in intermediate array 1030.

Figure 10D:
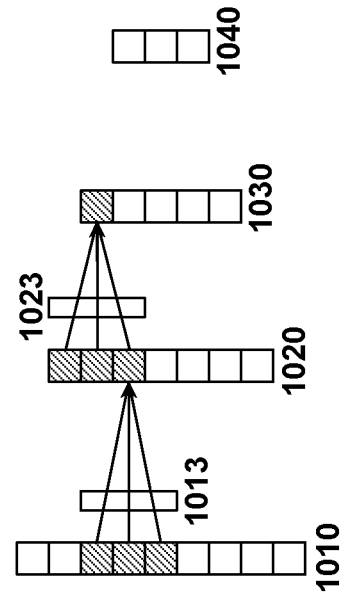

FIG. 10D illustrates the next iteration of the loop wherein both filters 1013 and 1023 are now striding down respective data arrays 1010 and 1020 during each iteration and generating intermediate data. Note that data that will no longer be needed is immediately discarded such that amount of data that is stored remains relatively small and can be kept within a local cache memory. The only data that needs to enter into the system is additional source pixels read into in pixel array 1010. That pixel data is added in only a pixel at time in this example such that there is very little strain on memory bandwidth. The only accesses to the main memory system are a pixel by pixel reading of the source image data. (Note that this is just one embodiment, the pixels could also be read in groups at a time to improve efficiency.)

Figure 10F:
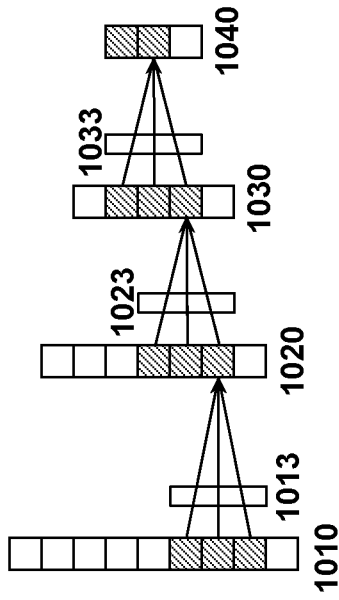
Figure 10E:
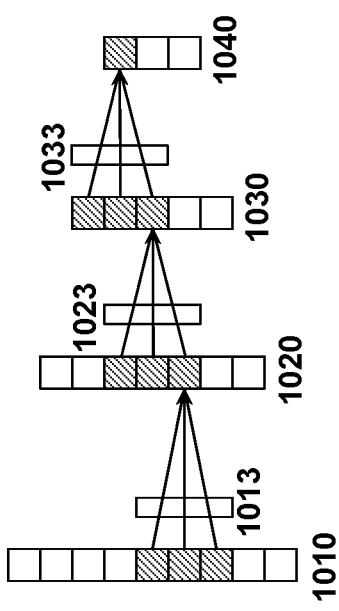

FIG. 10E illustrates the next iteration of the loop wherein all three convolution filters 1013, 1023, and 1033 are now striding down during each loop iteration generating intermediate data. Again, note that any data values no longer needed for further calculations are immediately discarded such that amount of data kept in the local cache memory is minimized. In FIG. 10E, the CNN processing system has now generated one of the final output data values in final data array 1040. But since it is not the last final output data value, the CNN system continues processing. FIG. 10F illustrates the next iteration wherein all three convolution filters 1013, 1023, and 1033 output another data value into data arrays 1020, 1030, and 1040, respectively. Note that each of the data arrays 1020, 1030, and 1040 now only have to store the data values necessary to supply the associated convolutional filters (1013, 1023, and 1033, respectively) with data. All other data can be discarded.

Figure 10G:
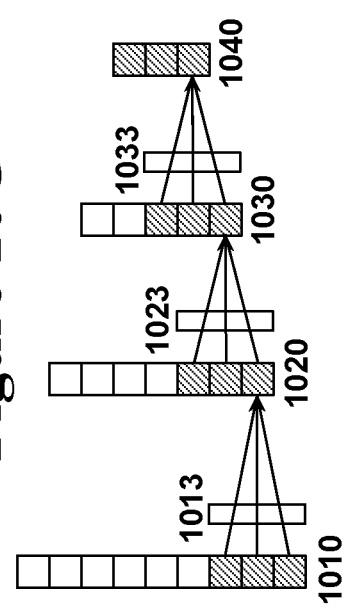

Finally, FIG. 10G illustrates a final iteration wherein all three convolutional filters 1013, 1023, and 1033 output one more data value. Referring back to FIG. 9, since the last final output data value has been put into data array 1040 the processing for this sub-stage is complete at step 940. Next, at step 960, the system then determines if this is the final processing sub-stage. If not, the system proceeds to step 970 where it moves to the next pipeline sub-stage and then processing begins for that next sub-stage at step 920. If it was the final processing sub-stage at step 960 then the system is complete and the final feature extraction results can be saved at step 980.

As illustrated in the conceptual processing diagrams of FIGS. 10A to 10G, the CNN processing system may load in source pixel data only as necessary and may discard any data when that data is no longer necessary such that the amount of data is minimized and can be kept within a limited local cache memory system. Furthermore, although this example has been described with reference to convolutional steps in the pipeline, these steps could just as easily have been pooling or any other type of processing.

Cone of Influence Based Processing

The previous section described a cone of dependency system for feature extraction processing wherein only the intermediate data that final output values are dependent upon are kept in the local cache memory. In a cone of influence mode of operation, each data value is calculated out as far as that data value influences later data values and then discarded. Since these convolutional operations combine results together with addition, partial results may be calculated and stored thus allowing calculations to proceed further such that intermediate data can be discarded faster.

The cone of influence feature extraction processing system is described with reference to the flow diagram of FIG. 11 and the conceptual CNN processing diagrams of 12A to 12C. As with the previous convolutional neural network example, this system operates with 3 data value wide convolutional filter that uses a stride of one.

Referring to step 1110 of FIG. 11, a long convolutional neural network feature extraction processing pipeline such as the one in FIG. 5 may first be divided into sub-stages comprising groups of processing steps to limit the operation. For example, the feature extraction processing pipeline may be divided into sub-stages 521 and 522 instead of attempting to process all of the feature extraction steps at once.

Figure 12A:
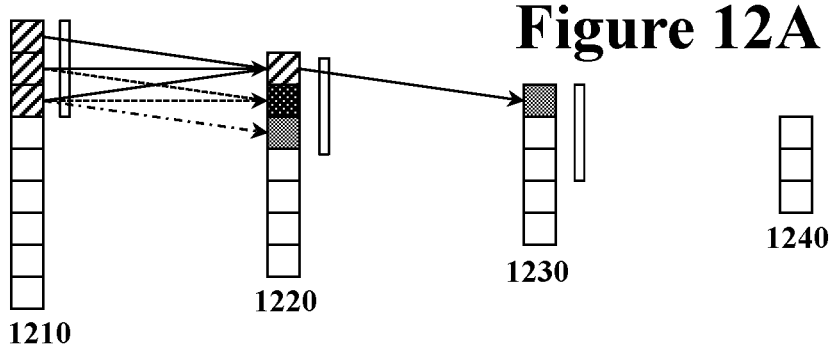
FIG. 12A to 12C illustrate cone of dependency processing of an example one-dimensional convolutional neural network.

Referring back to the flow diagram of FIG. 11, the feature extraction processing begins at step 1120 wherein a first chunk of input data is loaded in for the current sub-stage. This is illustrated in the conceptual diagram of FIG. 12A as the first 3 data pixels loaded into pixel data array 1210. Next, the system then processes as many full results and partial results as possible with the currently available chunk of data (and saved data) as stated in step 1130. With the first chunk of data one full convolutional filter result can be calculated for the second data array 1220 as illustrated in FIG. 12A. Two partial results can also be calculated in the second data array 1220, one partial result from two source data values and one partial result from just one source data value. Furthermore one partial result can be calculated in the third data array 1230 using the one complete intermediate data value at the top of second data array 1220.

Next, at step 1140 of FIG. 11, the system saves all the partial results and any final output results while discarding the current chunk of source data and any completed intermediate results. In the processing example of FIG. 12A, this means that only the two partial results in the second data array 1220 and the one partial result in the third data array 1230 are saved while all of the other data is discarded. The system can discard all the current source data and completed intermediate results because those data values have already been used as much as possible to calculate other partial results or final output results. In other words, those data values have been extended to their full influence.

Referring back to the flow diagram of FIG. 11, the system then proceeds to step 1150 where it determines if that was the last chunk of source data. If it was the last chunk of data, then all the final results should have been calculated and processing for the current sub-stage would be completed. But in the situation illustrated in FIG. 12A, only a first chunk of source data has been processed so the system proceeds to step 1155 where the CNN system loads another chunk of source data for feature extraction processing and then returns to step 1130 for additional feature extraction processing.

Figure 12B:
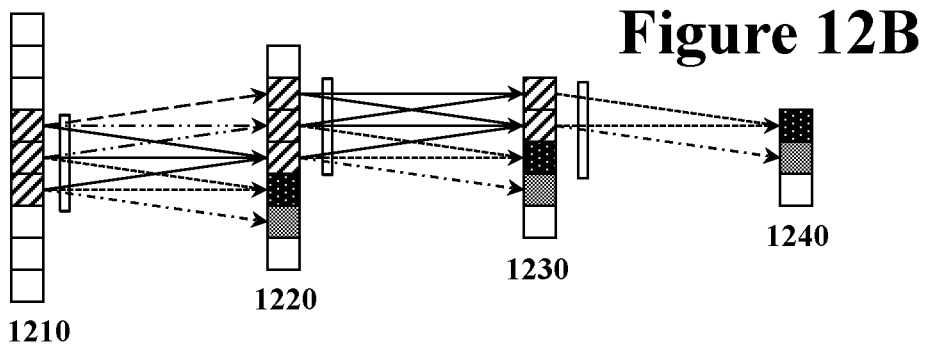

Returning to step 1130, the CNN system processes the newly loaded chunk of data and the saved partial results to their full influence to generate as many full results and partial results as possible from that data. Thus, the system begins feature extraction processing upon the three saved partial results saved from FIG. 12A and a new chunk of three source pixel data values loaded into pixel data array 1210 as illustrated in FIG. 12B. Specifically, the system calculates three full results and two partial results in second data array 1220, two full results and two partial results in third data array 1230, and two partial results in fourth (final) data array 1240 as illustrated in FIG. 12B.

After the processing of step 1130, the system then again proceeds to step 1140 where the system discards all of the data except partial result data and any final output results. Next, at step 1150, the system determines that it is not the last chunk of data such that the system proceeds back to step 1155 where the system then loads another chunk of source data for more feature extraction processing.

Figure 12C:
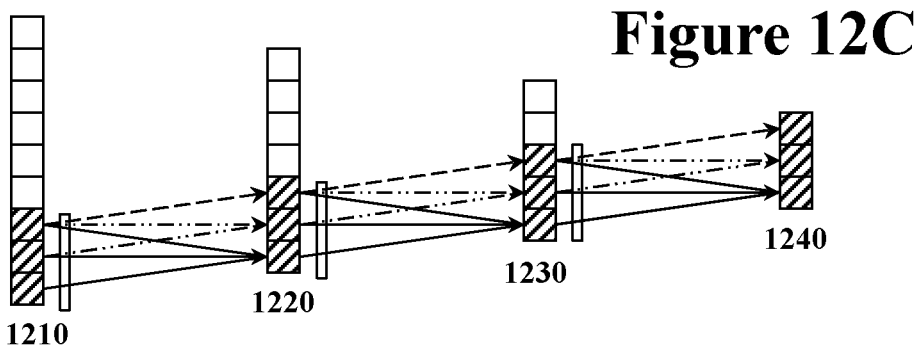

Finally, FIG. 12C illustrates the system as it performs a final processing through step 1130. As illustrate in FIG. 12C, the new chunk of source data in pixel data array 1210 completes three intermediate data results in second data array 1220. Those three complete intermediate data values in second data array 1220 are then used to complete three intermediate data values in the third data array 1230. And finally, those three completed intermediate data results in the third data array 1230 are used to complete the three final output data results in the fourth (final) data array 1240.

Referring back to FIG. 11, at step 1140, the system can then discard all but the final output results (the three final output data results in the final data array 1240). Next, at step 1150, the system determines that this was the last chunk of source data such that the feature extraction processing for this sub-stage is complete. The system then determines at step 1160 if this is the last processing sub-stage and if not, the system proceeds to step 1170 to move on to the next sub-stage of processing and begins feature extraction processing for that sub-stage at step 1120. (Note that the system may use the saved final results in the final data array 1240 as source data for later substages.) Otherwise, if this was the final sub-stage at step 1160 then the CNN processing system can save the final results of the convolutional neural network feature extraction processing at step 1180.

Combining Techniques

The Cone of Dependency techniques in steps 930 to 955 and the Cone of Influence techniques in steps 1130 to 1155 can significantly reduce main memory accesses by computing several steps of CNN processing using small amounts of source data loaded into the system. By limiting the amount of source data loaded in and only continuing to store intermediate results that will be needed to calculate more results, the CNN processing system may be able to keep all of the needed data within a local cache memory system. The only accesses to main memory system are to load in source data in small amounts just once. In this manner, these CNN processing techniques can be used to quickly and efficiently generate the needed results with minimal access to a main memory system.

However, in many situations the Cone of Dependency techniques in steps 930 to 955 and the Cone of Influence techniques in steps 1130 to 1155 alone may not be enough to ensure that all of the data will fit within a local cache memory system. In order to most efficiently use the local cache memory, the parameters of the other two techniques for reducing memory usage disclosed can be adjusted. Firstly, the technique of partitioning source digital images into smaller subareas as set forth with reference to FIGS. 6A to 6C may be used to reduce the size of the source digital image data being processed. Secondly, the technique of dividing the long feature extraction processing pipeline into smaller sets of sub-stages as set forth with reference to FIG. 5 can be used to reduce the number of feature extraction processing steps that will be performed at once.

In this manner, by partitioning the source image data into smaller sections and dividing the feature extraction processing pipeline into smaller sets of sub-stages, a CNN processing system can find a setting wherein all of the data can fit within a local cache memory and thus optimize system performance. By optimizing cache memory usage (and thereby minimizing main memory accesses), the feature extraction processing system saves both processing time and energy thereby greatly performing the processing of convolutional neural network feature extraction processing.

Slicing Images for Parallel Processing

The previous sections disclose techniques for optimizing the usage of 1 cache memory systems to improve the processing performance of feature extraction techniques used in convolutional neural networks. However, to further improve the performance, the feature extraction task of a convolutional neural network can be divided up into multiple different independent tasks and performed by multiple different processors in parallel.

Figure 13B:
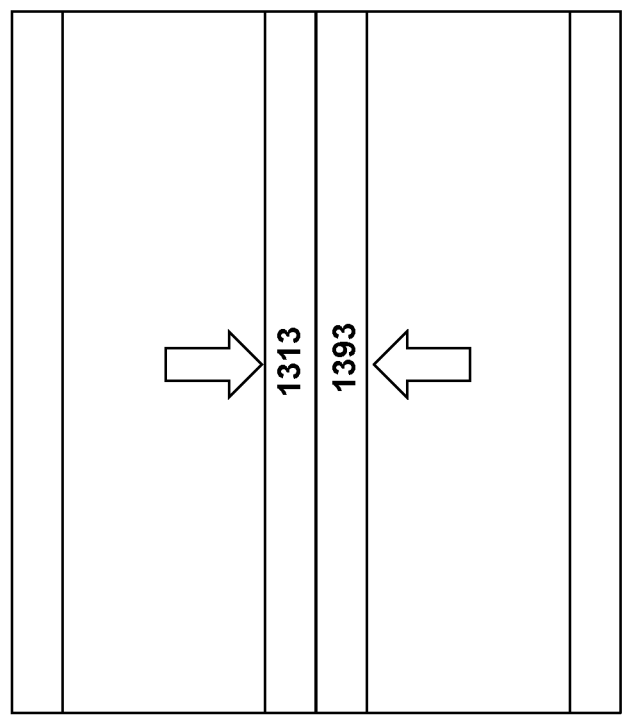
FIG. 13B conceptually illustrates a digital image of FIG. 13A wherein the two convolutional processing tasks have met in the center of the image.
Figure 13A:
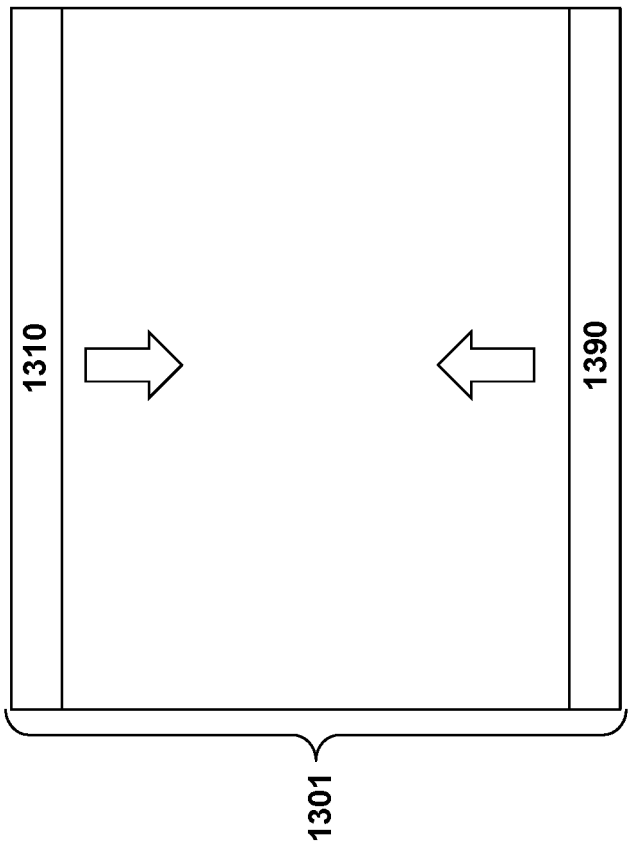
FIG. 13A conceptually illustrates a digital image being convolutional processed both from top to bottom and from bottom to top.

FIG. 13A conceptually illustrates a digital image 1301. To perform parallel convolutional processing of the digital image 1301, a first processing task can begin convolutional processing at the top slice 1310 proceeding downward and a second processing task can begin convolutional processing at the bottom slice 1390 proceeding upward. These two processing tasks will soon meet at the center as illustrated in FIG. 13B wherein two slices 1313 and 1393 meet. At this point, the two tasks must synchronize and the overlapping portion should be processed.

Figure 13C:
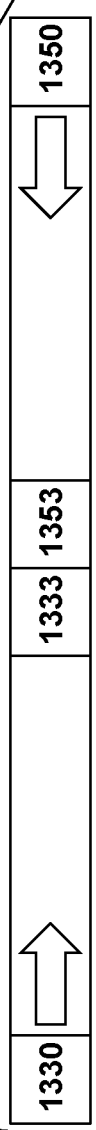
FIG. 13C illustrates an expanded slice from the digital image illustrated in FIG. 13A.

In addition to processing tasks that operate vertically, different processing tasks can execute horizontally in parallel. Below the digital image 1301 an expanded slice is illustrated in FIG. 13C. The job of processing the slice of FIG. 13C can be performed by two processing tasks (1330 and 1350) operating in parallel. Specifically, processing task 1330 starts on the left side of the slice and works its way rightward and while processing task 1350 simultaneously starts on the right side of the slice and works its way leftward. Again, the two processing tasks will soon meet as illustrated by processing tasks (1333 and 1353) and the overlapping area must be processed by one of the tasks.

Figure 14A:
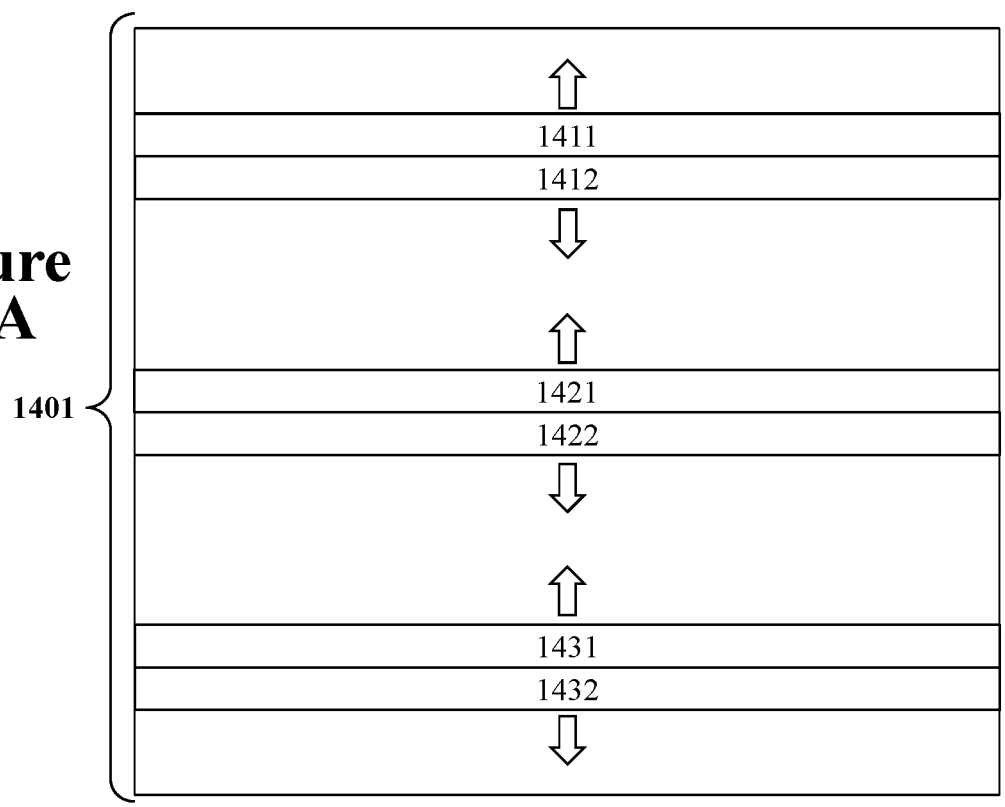
FIG. 14A conceptually illustrates a digital image being convolutional processed by six independent convolutional processing tasks.
Figure 14B:
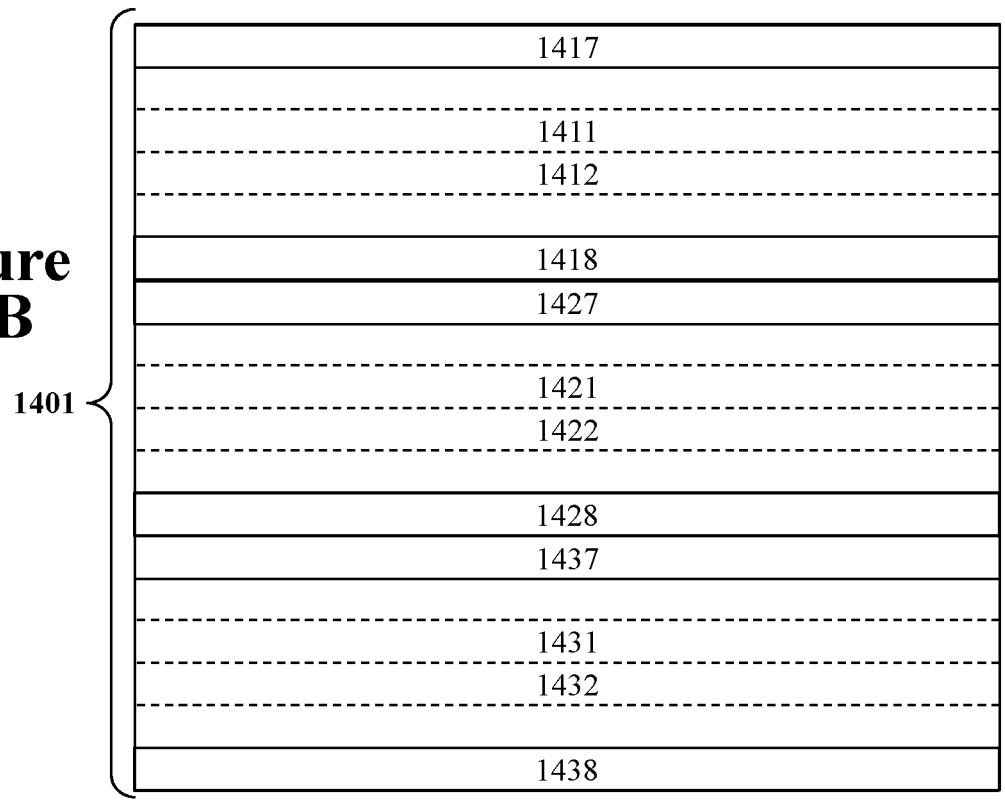
FIG. 14B conceptually illustrates a digital image of FIG. 14A wherein the six convolutional processing tasks have completed.

The convolutional processing tasks can be divided many different ways. FIG. 14A illustrates a digital image 1401 that is being processed by six different convolutional processing tasks. Convolutional processing tasks 1411, 1421, and 1431 all move downward whereas convolutional processing tasks 1412, 1422, and 1432 all move downward. Again, convolutional processing tasks that meet must synchronize and handle the overlapping area. For example, convolutional tasks 1412 and 1421 will meet as illustrated in FIG. 14B as 1418 and 1427 where those processing tasks must synchronize and process the overlapping area. Similarly, convolutional tasks 1422 and 1431 meet as illustrated in FIG. 14B as 1428 and 1437 where those two processing tasks must synchronize and process the overlapping area.

Note that the horizontal techniques disclosed with reference to FIG. 13C can also be used in the example of FIGS. 14A and 14B. In this manner, twelve simultaneous processing tasks can very quickly convolutional process the entire digital image very quickly.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of extracting features from a digital image with a multi-step convolutional processing system in a memory efficient manner, said method comprising the stages of:
    loading a subset of digital image data for a feature extraction operation;
    executing said feature extraction operation on said subset of digital image data and any saved intermediate results to generate a first set of results;
    executing any additional later step operations of said multi-step convolutional processing system using said first set of results of said convolutional stride calculation to generate a second set of results;
    saving intermediate data in said first set of results and said second set of results still needed for calculating later step operations in said multi-step convolutional processing system as saved intermediate results and discarding all other data; and
    repeating said stages of loading, executing, executing, and saving until a final output from said multi-step convolutional processing system is complete.

2. The method of extracting features from a digital image with a multi-step convolutional processing system in a memory efficient manner as set forth in claim 1 wherein said multi-step convolutional processing system comprises a convolutional neural network.

3. The method of extracting features from a digital image with a multi-step convolutional processing system in a memory efficient manner as set forth in claim 1 wherein a step in said multi-step convolutional processing system comprises a pooling operation.

4. The method of extracting features from a digital image with a multi-step convolutional processing system in a memory efficient manner as set forth in claim 1, said method further comprising the stages of:
    first dividing said digital image into a set of image sub-areas; and
    performing said stages of loading, executing, executing, saving, and repeating upon each of said image sub-areas.

5. The method of extracting features from a digital image with a multi-step convolutional processing system in a memory efficient manner as set forth in claim 4 wherein said image sub-areas of said set of image sub-areas overlap each other.

6. The method of extracting features from a digital image with a multi-step convolutional processing system in a memory efficient manner as set forth in claim 1, said method further comprising the stages of:
    first dividing said multi-step convolutional processing system into a set sub-stages, each of said sub-stages comprising a group of steps from said multi-step convolutional processing system; and
    performing said stages of loading, executing, executing, saving, and repeating upon each of said sub-stages comprising said group of steps.

7. The method of extracting features from a digital image with a multi-step convolutional processing system in a memory efficient manner as set forth in claim 1 wherein a first processing task operates said method of claim 1 on a first portion of said digital image and a second processing task operates said method of claim 1 on a second portion of said digital image.

8. A method of extracting features from a digital image with a multi-step convolutional processing system in a memory efficient manner, said method comprising the stages of:
    loading a subset of digital image data for a feature extraction operation;
    executing full and partial feature extraction operations on said subset of digital image data and any saved partial results;
    saving all partial results and final convolutional processing system output results and discarding all other data; and
    repeating said stages of loading, executing, executing, and saving until a final output from said multi-step convolutional processing system is complete.

9. The method of extracting features from a digital image with a multi-step convolutional processing system in a memory efficient manner as set forth in claim 8 wherein said multi-step convolutional processing system comprises a convolutional neural network.

10. The method of extracting features from a digital image with a multi-step convolutional processing system in a memory efficient manner as set forth in claim 8 wherein a step in said multi-step convolutional processing system comprises a pooling operation.

11. The method of extracting features from a digital image with a multi-step convolutional processing system in a memory efficient manner as set forth in claim 8, said method further comprising the stages of:

first dividing said digital image into a set of image sub-areas;

performing said stages of loading, executing, saving, and repeating upon each of said image sub-areas.

12. The method of extracting features from a digital image with a multi-step convolutional processing system in a memory efficient manner as set forth in claim 11 wherein said image sub-areas of said set of image sub-areas overlap each other.

13. The method of extracting features from a digital image with a multi-step convolutional processing system in a memory efficient manner as set forth in claim 8, said method further comprising the stages of:

first dividing said multi-step convolutional processing system into a set sub-stages, each of said sub-stages comprising a group of steps from said multi-step convolutional processing system; and performing said stages of loading, executing, saving, and repeating upon each of said sub-stages comprising said group of steps.

14. The method of extracting features from a digital image with a multi-step convolutional processing system in a memory efficient manner as set forth in claim 8 wherein a first processing task operates said method of claim 8 on a first portion of said digital image and a second processing task operates said method of claim 8 on a second portion of said digital image.

15. An apparatus for extracting features from a digital image with a multi-step convolutional processing system, said apparatus comprising:

a digital processor;

a local cache memory system coupled to said digital processor; and a control system, said control system loading a subset of digital image data into said local cache memory system, executing a feature extraction operation on said subset of digital image data and any saved intermediate data on said processor, executing any additional later step operations of said multi-step convolutional processing system on said processor, saving intermediate data still needed for calculating later step operations in said local cache memory while discarding all other data, and repeating said operations of loading, executing, executing, and saving until a final output from said multi-step convolutional processing system is complete.

16. The apparatus for extracting features from a digital image with a multi-step convolutional processing system as set forth in claim 15 wherein said multi-step convolutional processing system comprises a convolutional neural network.

17. The apparatus for extracting features from a digital image with a multi-step convolutional processing system as set forth in claim 15 wherein said control system controls a first processing task operating on a first portion of said digital image and said control system controls a second processing task operating on a second portion of said digital image.

18. An apparatus for extracting features from a digital image with a multi-step convolutional processing system, said apparatus comprising:

a digital processor;

a local cache memory system coupled to said digital processor; and a control system, said control system loading a subset of digital image data into said local cache memory, executing full and partial feature extraction operations on said subset of digital image data and any saved partial results, saving all partial results and final convolutional processing system output results in local said cache memory system while discarding all other data, and repeating said operations of loading, executing, and saving until a final output from said multi-step convolutional processing system is complete.

19. The apparatus for extracting features from a digital image with a multi-step convolutional processing system as set forth in claim 18 wherein said multi-step convolutional processing system comprises a convolutional neural network.

20. The apparatus for extracting features from a digital image with a multi-step convolutional processing system as set forth in claim 18 wherein said control system controls a first processing task operating on a first portion of said digital image and said control system controls a second processing task operating on a second portion of said digital image.

\* \* \* \* \*